United States Patent
Ebert

(10) Patent No.: US 11,480,803 B1
(45) Date of Patent: Oct. 25, 2022

(54) REMOVABLE FRAMES FOR HEAD-MOUNTED DISPLAY SYSTEMS

(71) Applicant: Meta Platforms Technologies, LLC, Menlo Park, CA (US)

(72) Inventor: Ryan Michael Ebert, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/393,034

(22) Filed: Aug. 3, 2021

Related U.S. Application Data

(63) Continuation of application No. 15/986,855, filed on May 23, 2018, now Pat. No. 11,163,166.

(51) Int. Cl.
*G02B 27/01* (2006.01)
*G02B 27/00* (2006.01)

(52) U.S. Cl.
CPC ..... *G02B 27/0176* (2013.01); *G02B 27/0093* (2013.01); *G02B 2027/0161* (2013.01); *G02B 2027/0169* (2013.01); *G02B 2027/0178* (2013.01)

(58) Field of Classification Search
None
See application file for complete search history.

(56) References Cited

U.S. PATENT DOCUMENTS

| | | |
|---|---|---|
| 2010/0149073 A1 | 6/2010 | Chaum et al. |
| 2013/0222235 A1 | 8/2013 | Abdollahi et al. |
| 2015/0277123 A1 | 10/2015 | Chaum et al. |
| 2017/0285337 A1 | 10/2017 | Wilson et al. |
| 2019/0025588 A1 | 1/2019 | Osterhout et al. |
| 2019/0056600 A1 | 2/2019 | Danziger et al. |
| 2020/0012101 A1 | 1/2020 | Yuki et al. |

*Primary Examiner* — Andre L Matthews
(74) *Attorney, Agent, or Firm* — FisherBroyles, LLP

(57) ABSTRACT

In one example, an apparatus may include a frame that includes an optical component configured for use with a near-eye display that is part of a head-worn display system. The frame magnetically attaches to the head-worn display system, and when the frame is attached to the head-worn display system, the frame may align the optical component for use with the near-eye display. Various other methods, systems, and computer-readable media are also disclosed.

20 Claims, 9 Drawing Sheets

REMOVABLE FRAMES FOR HEAD-MOUNTED DISPLAY SYSTEMS

CROSS REFERENCE TO RELATED APPLICATION

This application is a continuation of U.S. patent application Ser. No. 15/986,855, entitled "REMOVABLE FRAMES FOR HEAD-MOUNTED DISPLAY SYSTEMS," filed 23 May 2018, the disclosure of which is incorporated, in its entirety, by this reference.

BACKGROUND

Head-mounted display systems may be used for various virtual reality, augmented reality, and/or mixed reality applications. Unfortunately, many conventional head-mounted display systems may be uncomfortable or unusable for users who need to wear prescription glasses when using a head-mounted display system. Furthermore, while some traditional head-mounted display systems may be configured to allow users to wear the head-mounted system over a pair glasses, such solutions may be uncomfortable and/or may not allow for the use of eye-tracking systems.

SUMMARY

As will be described in greater detail below, the instant disclosure describes frames that are magnetically attached to either a single near-eye display or to a pair of near-eye-displays and removable by merely disengaging the magnets. Some systems may include mechanical fittings that constrain the frame to be reattached to the one or two near-eye displays in the same alignment as before the frame was removed. Moreover, when electrical connections are needed (for example, for powering emitters), the frames described herein may include passive electrical contacts that automatically make electrical connections when a frame is attached.

In one example, an apparatus may include a frame having an optical component configured for use with a near-eye display that is part of a head-worn display system. The frame may magnetically attach to the head-worn display system, and when the frame is attached to the head-worn display system, the frame may align the optical component for use with the near-eye display.

According to some embodiments, the optical component may include a lens configured to, when aligned for use with the near-eye display, focus light from the near-eye display on an eye of a user, and in one example the lens may be dimensioned to correct for at least a portion of a refractive error of the eye of the user. In some embodiments, the optical component may include an emitter that, when aligned with the near-eye display, emits light toward an eye of a user, and the head-worn display system may include an eye-tracking subsystem configured to track the eye of the user by detecting light from the emitter that is reflected from the eye of the user. In some examples, the emitter may include infrared light emitters disposed around a perimeter of the frame. In other examples, the head-worn display system may include a power source for the emitter, and the frame may include an electrical terminal that, when the frame is attached to the head-worn display system, electrically couples the emitter to the power source. The electrical terminal may include a spring-loaded pin and/or a socket dimensioned to receive a spring-loaded pin.

According to at least one embodiment, the optical component may include a lens dimensioned to, when aligned with the near-eye display, focus light from the near-eye display on an eye of a user. The optical component may also include an infrared emitter that, when aligned with the near-eye display, emits infrared light toward the eye of the user. The head-worn display system may include an eye-tracking subsystem configured to track the eye of the user by detecting infrared light reflected from the eye of the user.

In at least one example, the optical component may attach to the frame via a kinematic mounting mechanism that may include a first spherical surface in contact with a concave tetrahedron, a second spherical surface in contact with a v-shaped groove, and a third spherical surface in contact with a flat plate. In another example, the mounting mechanism may include a first spherical surface in contact with a first v-shaped groove, a second spherical surface in contact with a second v-shaped groove, and a third spherical surface in contact with a third v-shaped groove, with all three v-shaped grooves radiating outward from a common center. In another embodiment, the frame may be configured to magnetically attach to a head-worn display system at an exit-pupil side of the near-eye display.

In some embodiments, a head-worn display system may include a near-eye display with a frame that includes an optical component configured for use with the near-eye display. The frame may be magnetically detachable from the head-worn display system, and when the frame is attached to the head-worn display system, the frame may align the optical component for use with the near-eye display. In some examples, the frame may be dimensioned to hold the optical component in front of an eye of a user. In some examples, the near-eye display may have at least one virtual-reality display screen. According to at least one embodiment, a near-eye display in a head-worn optical system may include, in addition to a frame of one of the embodiments described above, a projector and a waveguide including a coupling element that receives light from the projector and a decoupling element that transmits the light from the projector toward an eye of a user. According to at least one example device that includes a frame of one of the embodiments described above, an optical component may include a right lens and a left lens, and the frame may be dimensioned to hold the right lens between a right eye of a user and the near-eye display and to hold the left lens between a left eye of the user and the near-eye display. In another example, the optical component may include at least one left emitter that emits light toward the left eye of the user and at least one right emitter that emits light toward the right eye of the user, and the head-worn display system may include an eye-tracking subsystem configured to track the left and right eyes of the user by detecting light from the left and right emitters that is reflected from the left and right eyes of the user. The left lens may be dimensioned to correct for at least a portion of a refractive error of the left eye of the user, and the right lens may be dimensioned to correct for at least a portion of a refractive error of the right eye of the user.

Another embodiment may include a device having a frame that may be configured to releasably attach to a head-worn optical system that includes an eye-tracking subsystem. In such embodiments, the frame may have at least one emitter disposed within the frame, wherein the frame, when attached to the head-worn optical system, positions the emitter to emit light toward an eye of a user. The eye-tracking subsystem may be configured to track the eye of the user by detecting light from the emitter that is reflected from the eye of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
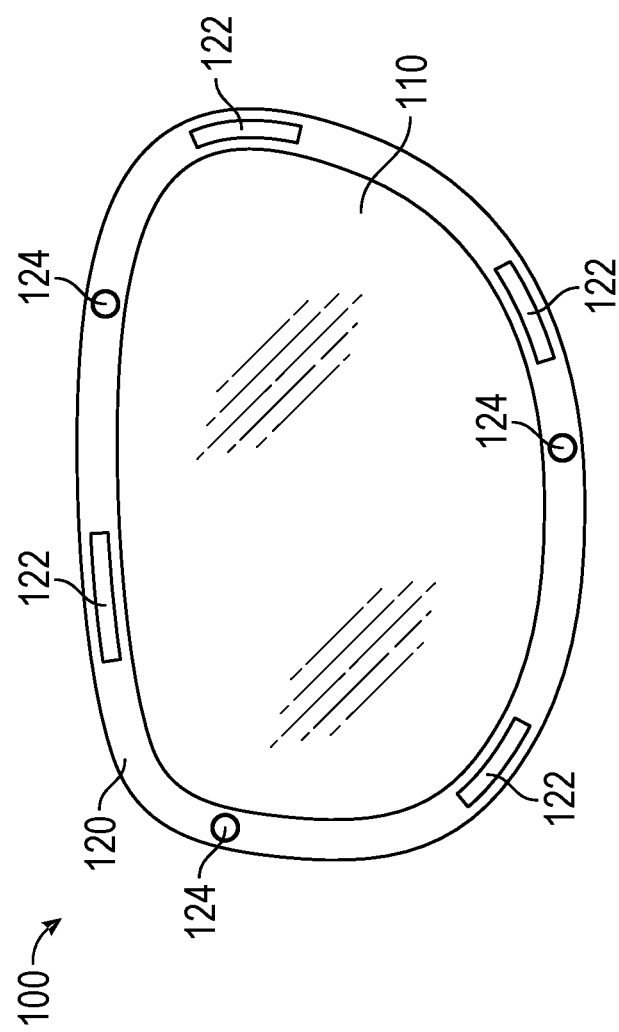
FIG. 1 depicts an exemplary optical assembly with a frame for magnetically securing a lens to a head-worn display system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to frames for magnetically attaching optical components, such as lenses or light sources, to a head-worn display system. The frames disclosed herein may be configured to align an optical component for use with a near-eye display of the head-worn display system. In some embodiments, a frame may also include mechanical fittings that constrain the frame to be attached to the head-worn display systems in the same alignment each time. Moreover, when electrical connections are needed (for example, for powering infrared emitters of an eye-tracking system), embodiments described herein may include frames with one or more electrical contacts that automatically establish electrical connections when the frame is attached to a headset.

The frames disclosed herein may be used to secure various types of optical components to head-worn display systems to provide additional functionality to the display systems. For example, a frame may include active optical elements, such as light emitters and/or sensors, for use with an eye-tracking system. Additionality or alternatively, the frames may include passive optics, such as prescription lenses. By including passive and/or active optical elements in detachable frames, embodiments of this disclosure may enable head-mounted displays to be upgraded and/or customized in ways that may not be possible in traditional head-mounted display systems.

Embodiments of this disclosure may improve a user's experience in a variety of ways. For example, the detachable frames disclosed herein may enable a user to easily and quickly add functionality (e.g., eye-tracking) to a headset, remove functionality from a headset, upgrade an optical component of a headset (e.g., a lens or an eye-tracking device), swap lenses to provide customized optical correction for particular users, etc. In this manner, embodiments of the instant disclosure may provide improved ease-of-use, better customization, and/or other features and advantages over traditional head-worn display systems.

Figure 2:
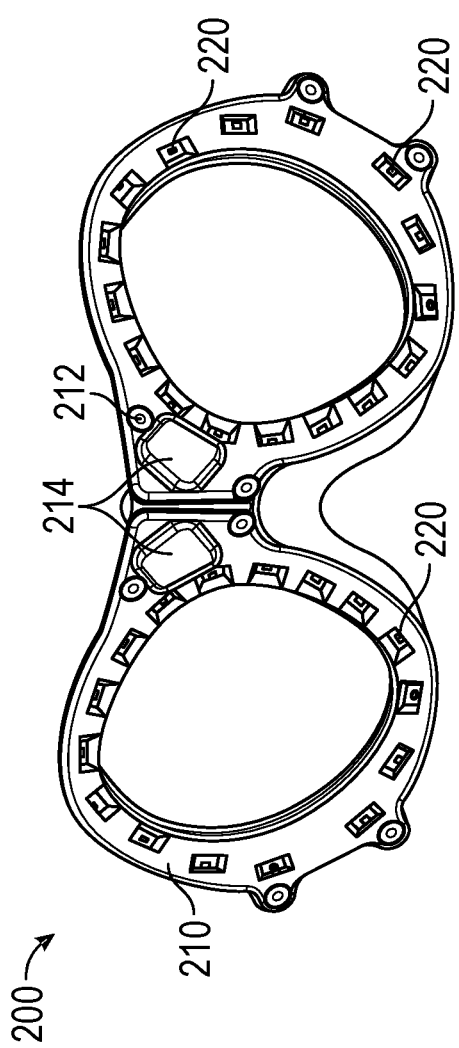
FIG. 2 depicts an exemplary optical assembly with a frame for magnetically securing light emitters to a head-worn display system.
Figure 3:
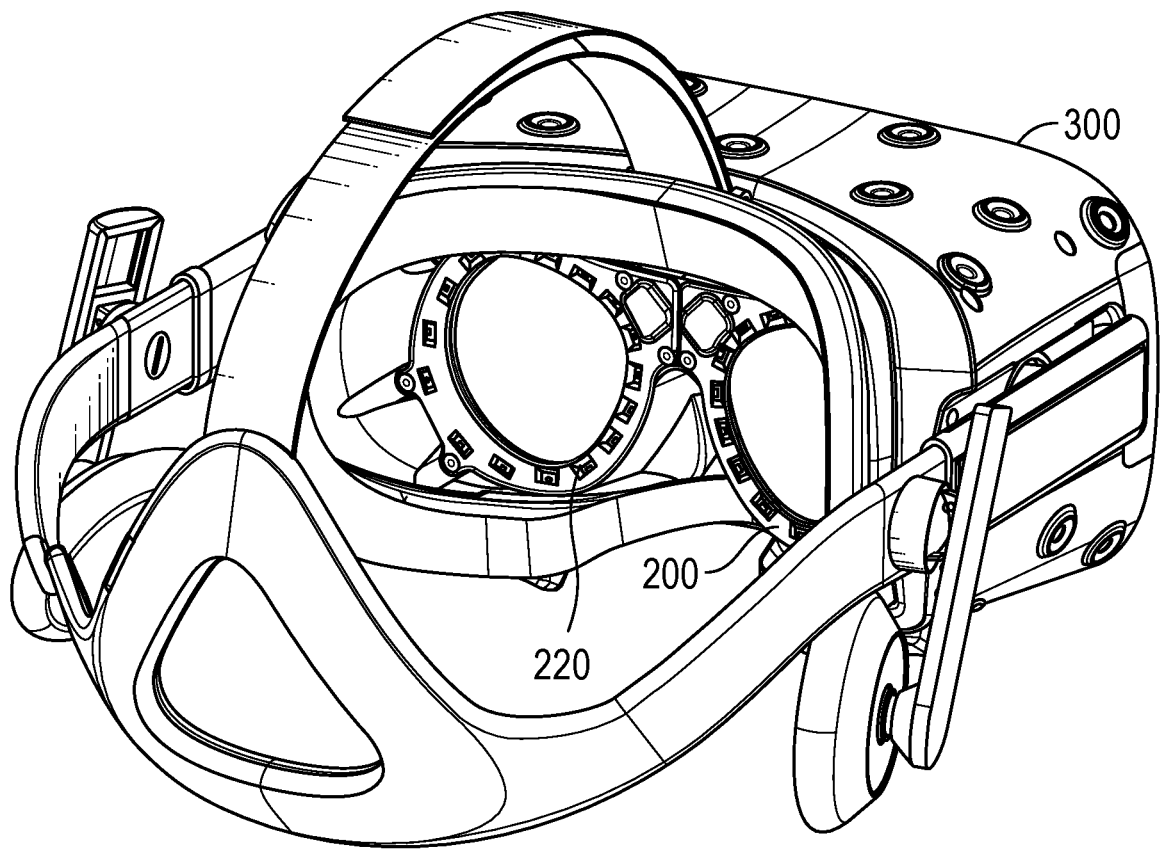
FIG. 3 depicts an exemplary head-worn display system.
Figure 4:
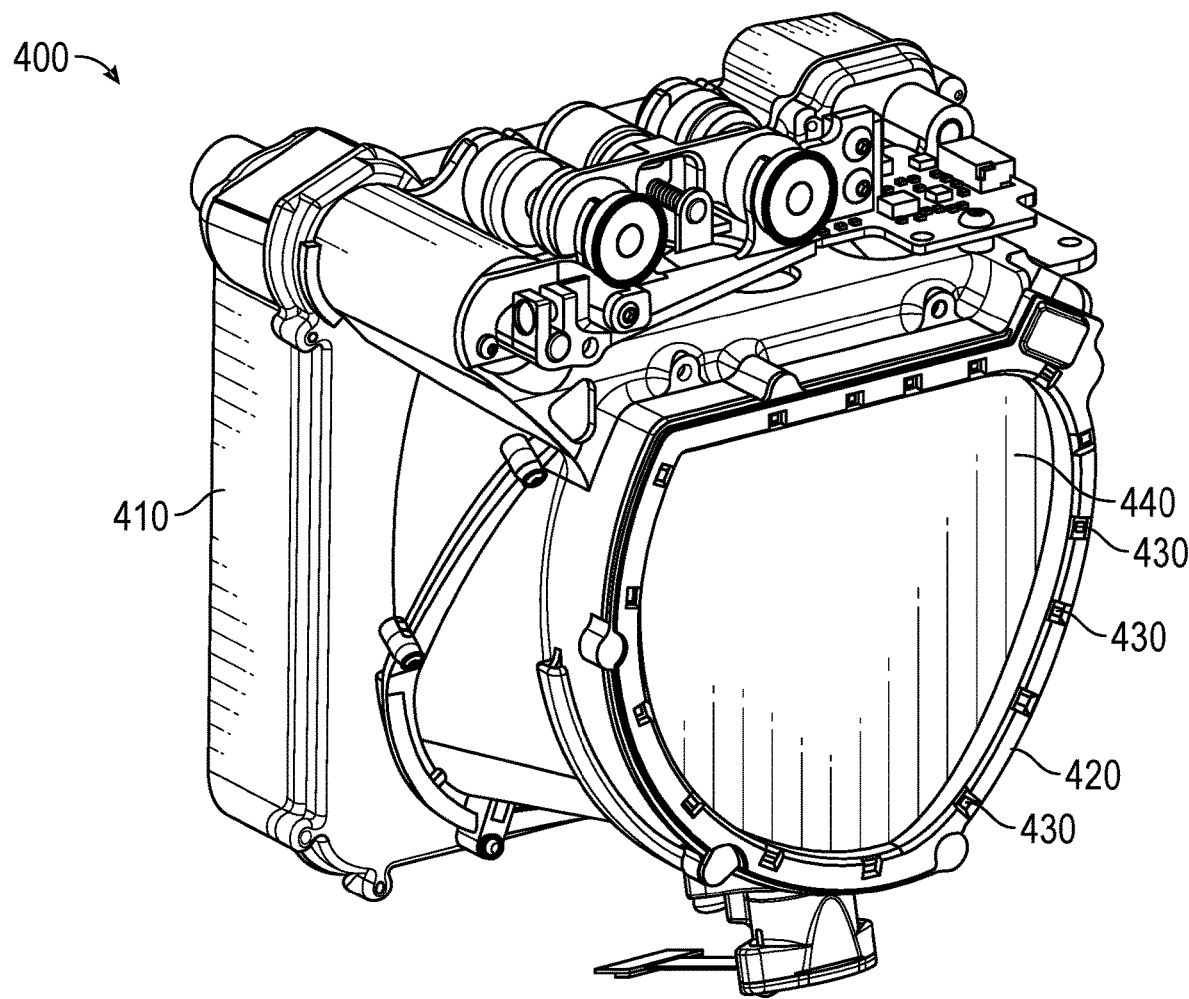
FIG. 4 depicts an optical assembly magnetically attached to an optical pod.
Figure 5:
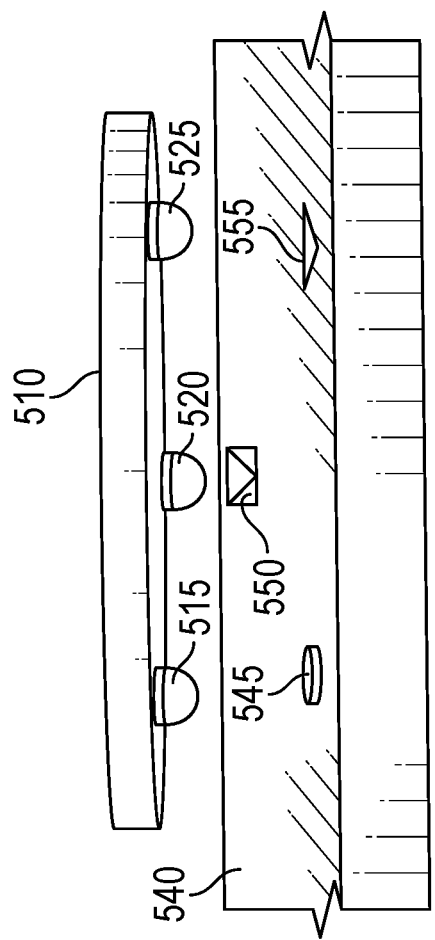
FIG. 5 depicts an exemplary coupling mechanism.
Figure 6:
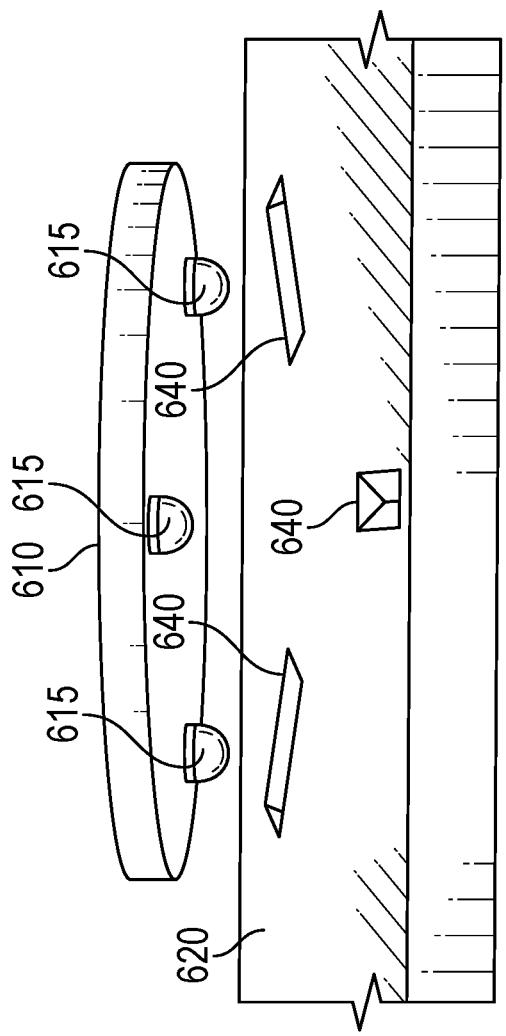
FIG. 6 depicts another exemplary coupling mechanism.
Figure 7:
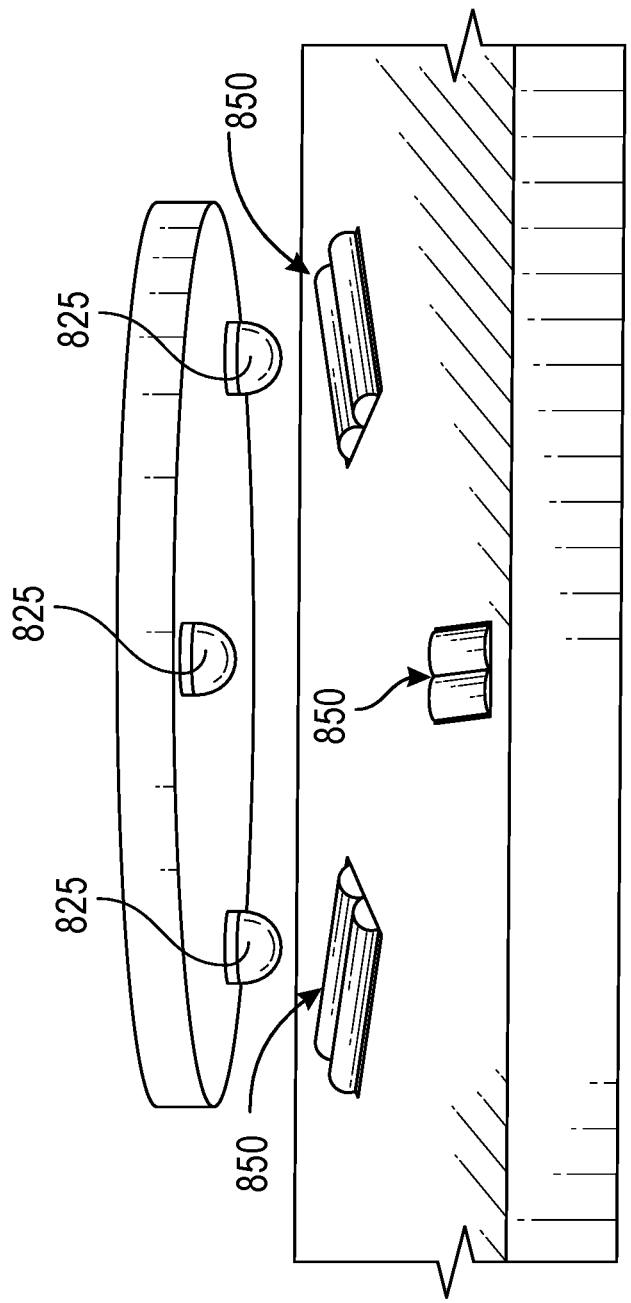
FIG. 7 depicts another exemplary coupling mechanism
Figure 8:
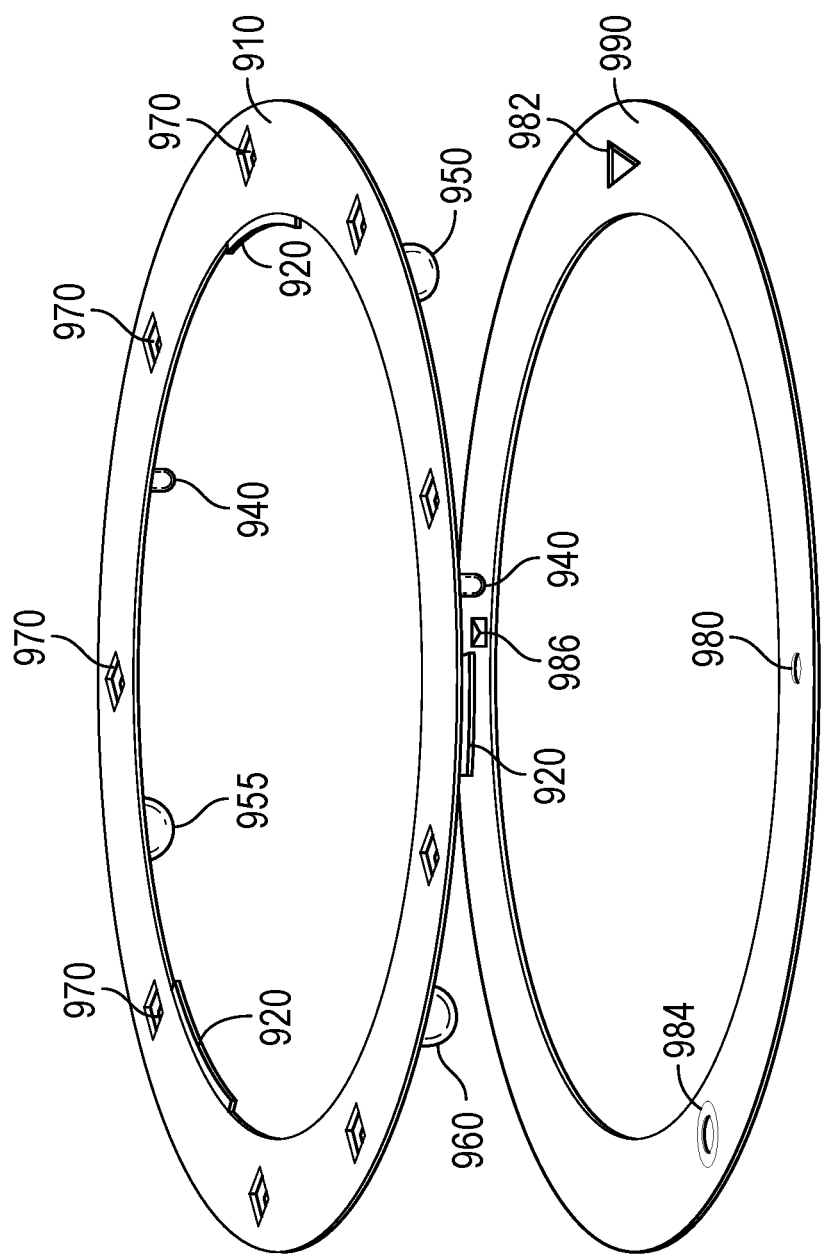
FIG. 8 depicts a frame with electrical terminals for coupling to an electrical system of a head-worn display.
Figure 9:
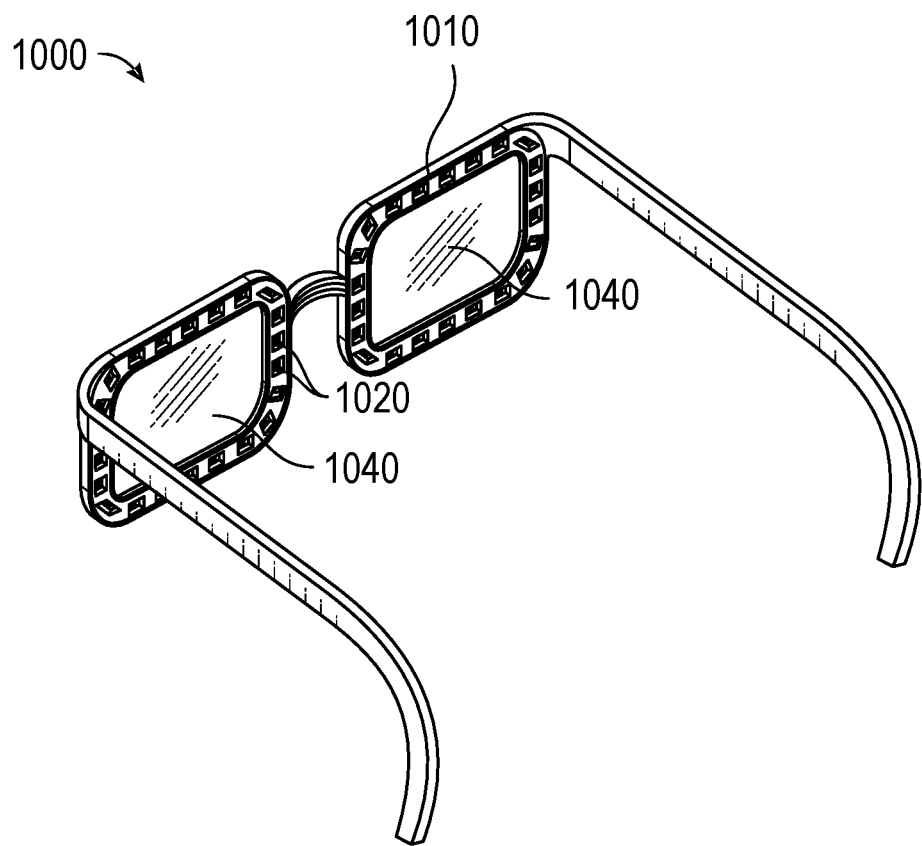
FIG. 9 depicts an optical assembly magnetically coupled to an augmented-reality device.

The following will provide, with reference to FIGS. 1-10, detailed descriptions of various types and forms of frames that may be used with near-eye displays of head-worn display systems. The discussion associated with FIGS. 1 and 2 provides examples of optical assemblies with frames that include optical elements and are configured to magnetically attach to head-worn displays. The discussion corresponding to FIGS. 3 and 4 provides examples of how frames may be aligned with displays of head-worn display systems. The discussion of FIGS. 5-7 provides examples of restraint mechanisms, and the discussion corresponding to FIG. 9 shows how the detachable frames disclosed herein may be used with an exemplary augmented-reality device.

FIG. 1 depicts an optical assembly 100 with a lens 110 secured to a frame 120 that is configured to magnetically attach to a head-worn display system. Frame 120 may be configured to attach to the head-worn display system in a manner that aligns the optical component for use with a near-eye display (e.g., a screen, a waveguide, etc.). For example, frame 120 may align lens 110 with a near-eye display such that lens 110 is positioned between an eye of a user and the near-eye display and focuses light from the near-eye display onto the eye of the user.

Lens 110 may be configured to correct for at least a portion of a refractive error of an eye of the user. For example, lens 110 may be designed to correct fora spherical error (e.g., near-sightedness, far-sightedness, or presbyopia) of a user's eye and/or a cylindrical error (e.g., an astigmatism) of a user's eye. Lens 110 may additionally or alternatively be designed to correct for optical aberrations within a near-eye display system, to account for an inter-pupillary distance of a user's eyes, and/or to provide any other suitable optical enhancement for a near-eye display system.

In some examples, lens 110 may be an adjustable lens (e.g., a liquid lens) having a deformable optical element, a rigid backplane, and a deformable medium disposed between the rigid backplane and the deformable optical element. Frame 120 may include one or more actuators that are coupled to the deformable optical element and configured to change an optical property (e.g., an optical power) of the adjustable lens to correct for a user's refractive error, to provide varifocal capabilities to a head-worn display, etc. The actuators may be controlled and/or powered via an electrical connection between optical assembly 100 and a head-worn display system, as discussed in greater detail below.

While FIG. 1 shows a single frame 120 holding a single lens 110, some embodiments may include two separate frames that each hold a lens with one frame dimensioned to hold the right lens between a right eye of a user and the near-eye display and another frame dimensioned to hold the left lens between a left eye of the user and the near-eye display. Alternatively the right and left lenses may be secured to a single frame configured to hold the lenses in front of a user's eyes.

As shown, frame 120 may include magnetic attachment surfaces 122 and alignment surfaces 124. Magnetic attachment surfaces 122 may include any type or form of magnet or ferromagnetic material (e.g., iron, nickel, cobalt, etc.) suitable for use to magnetically secure frame 120 to a head-worn display system. In some embodiments, frame 120 may include a magnet configured to be attracted to a magnet embedded in the head-worn display system to align and secure frame 120 to the head-worn display system. As another example, frame 120 may be made from (or include one or more regions made from) ferromagnetic material configured to be attracted to one or more magnets in the head-worn display system. Conversely, frame 120 may include one or more magnets while the head-worn display system may include regions that are made from ferromagnetic materials and configured to be attracted to the magnets in frame 120 to hold frame 120 in position.

The frames and head-worn display systems disclosed herein may be configured with any suitable type or form of magnet. For example, either or both of a frame and a head-worn display system may include a permanent magnet that retains its magnetism once magnetized. Examples of permanent magnets may include neodymium iron boron (NdFeB), samarium cobalt (SmCo), alnico magnets, or ceramic or ferrite magnets. Alternatively, embodiments of the instant disclosure may include one or more electromagnets embedded within the frames or head-worn display systems disclosed herein.

Turning to FIG. 2, an optical assembly 200 may include a frame 210 with magnets 212 and surfaces 214 configured to secure and align frame 210 to a head-worn display system. Optical assembly 200 may also include emitters 220 embedded within or otherwise secured to frame 210. Emitters 220 may be any suitable type or form of light source, such as light-emitting diodes (LEDs). In some embodiments, emitters 220 may include LEDs that emit infrared light for use in an eye-tracking system.

Emitters 220 may be configured in a variety of ways. For example, emitters 220 may be mounted on a printed circuit board that is coupled to frame 120. The circuit board may be shaped to be integrated into all or a portion of a perimeter of frame 210. Thus, the printed circuit board may be dimensioned to provide some emitters 220 that direct light to a right eye and other emitters 220 that direct light to a left eye. In other examples, one circuit board may be provided for the left-eye emitters and another circuit board may be provided for the right-eye emitters. Alternatively, emitters 220 may be mounted directly to frame 120 and connected via wires.

In some embodiments, frame 120 may be dimensioned as a light baffle that constrains and/or directs light emitted from emitters 220 to an angle of emission toward a user's eye, thereby reducing or eliminating unwanted reflections from other surfaces.

Emitters 220 may be powered by any suitable power source. For example, emitters 220 may be powered by a power source (e.g., a battery) included in frame 210. Alternatively, emitters 220 may be powered by a power source in the head-worn display system (e.g., the same power source used to power a display and/or other electronic components of the head-worn display) and frame 210 may include electrical terminals for coupling emitters 220 to an electrical system of the head-worn display system. For example, an electrical terminal on frame 210 may include a spring-loaded pin and a corresponding terminal on the head-worn display system may include a socket dimensioned to receive the spring-loaded pin. Conversely, the head-worn display system may include the spring-loaded pin and frame 210 may include the socket dimensioned to receive the spring-loaded pin. Any other suitable type or form of electrical terminals may also be used.

Optical assembly 200 may be configured to align emitters 220 relative to a near-eye display to provide eye tracking for a head-worn display. For example, FIG. 3 shows a head-worn display system 300 to which optical assembly 200 may be attached to enhance an artificial reality experience. Head-worn display system 300 may include one or more near-eye displays that may provide an artificial reality experience for a user.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display connected to a host computer system, a standalone head-mounted display, a mobile device or computing system, or any other hardware platform capable of providing artificial reality content to one or more viewers.

As shown in FIG. 3, optical device 200 may be attached to head-worn display system 300 such that emitters 220 are aligned for use with an eye-tracking module (not shown) of head-worn display system 300. The eye tracking module may be configured to track eye position and eye movement of a user and may include a camera or other optical sensor positioned to capture light that is emitted from emitters 220 and reflected off a user's eyes. For example, optical device 200 may include at least one left emitter that emits light toward the left eye of the user and at least one right emitter that emits light toward the right eye of the user. In some examples, the light reflected from the user's eyes may be captured directly by one or more sensors within optical device 200 and/or head-worn display system 300. Alternatively, light reflected from the user's eyes may subsequently be reflected off of an optical component (e.g., a lens included in optical device 200, a lens in head-worn display system, etc.) that directs the reflected light to one or more optical sensors. In this example, the reflective optical component may be selectively reflective such that light used for eye tracking (e.g., infrared light) is directed to optical sensors while other light (e.g., visible light from a display and/or a real-world environment) passes through the optical component.

The eye-tracking module of head-worn display 300 may analyze the detected light to provide various types of information. For example, the eye-tracking module may analyze the detected light to determine an inter-pupillary distance of a user, to determine a three-dimensional (3D) position of each eye relative to the HMD (e.g., for distortion adjustment purposes), to identify a gaze direction of the user, to determine a distance at which the user's eyes are focused, etc.

The eye-tracking module may use any suitable technology or algorithm to track a user's eyes. In one example, infrared light (e.g., light within the wavelength range of 700 nanometers to 1 micrometer) may be projected onto each eye of the user and may include a dot pattern formed by emitters 220 located around the edge of frame 210. The eye tracking module may then analyze a reflection of the dot pattern from each eye of the user to identify a location of each pupil of the user.

As noted, while some frames disclosed herein may be configured to be positioned around or encircle optical apertures for each eye of a user (e.g., frame 210), other frames may be configured for use around a single optical aperture, as shown in FIG. 4. The example in FIG. 4 includes an optical pod 400 with a display housing 410 in which a virtual-reality display may be disposed. In some embodiments, two instances of optical pod 400 may be included in a head-mounted display system to provide an artificial reality experience to a user. A detachable frame 420 may be magnetically attached to optical pod 400. Frame 420 may include a set of light emitters 430 positioned around a perimeter of frame 420. Frame 420 may also include a lens 440 that may be designed according to an ophthalmic prescription of a user. By including a separate frame for each eye, embodiments of the instant disclosure may provide more flexibility in customizing a head-mounted display with optical elements.

As shown in FIGS. 3 and 4, frames 210 and 420 may be configured to be magnetically attached to the head-worn display at an exit-pupil side (i.e., an inside) of a near-eye display.

As noted, the frames shown in FIGS. 1-4 may be magnetically secured to head-worn display systems. In some embodiments, the magnetic attachment mechanisms may be designed to provide precise alignment of a frame to a head-worn display. In other embodiments, the frame and/or the head-worn display may include additional mounting mechanisms that help align the frame in the correct location on the head-worn display. In some embodiments, high-precision alignment may be important to ensure that components of an eye-tracking system are properly aligned (e.g., emitters on the frame may need to be aligned relative to sensors within the head-mounted display) and/or to ensure that solid electrical connections are made between a frame and a head-worn display. In some embodiments, the alignment mechanisms disclosed herein may be formed as an integral part of a frame and/or a head-worn display housing. Alternatively, the alignment mechanisms disclosed herein may include one or more elements embedded in or otherwise attached to a frame and/or a head-worn display housing.

FIGS. 5-8 show examples of alignment mechanisms for the frames disclosed herein. Some of these examples may be kinematic couplings that constrain all six of a frame's degrees of freedom when the frame is magnetically attached to a head-worn display. One example of a kinematic coupling that may be used to secure a frame to a head-worn display system is a Kelvin coupling, which may have three spherical surfaces that rest on a concave tetrahedron, a V-shaped groove pointing towards the tetrahedron, and a flat plate (see FIG. 5). Another example of a coupling that may be used to secure a frame to a head-worn display is a Maxwell coupling, which may include three V-shaped grooves that are oriented toward the center of the frame and three curved surfaces that fit within the three groves (see FIG. 6). Embodiments of the instant disclosure may also use various other restraint mechanisms that may limit two, three, four, five, or six degrees of movement of a frame when the frame is attached to a head-worn display system.

The coupling configuration depicted in FIG. 5 shows a frame 510 that comprises an optical component (not shown) and may be magnetically connected to a mounting surface 540 (e.g., a mounting surface on a head-mounted near-eye display) using three rounded, spherical connectors (mounts) 515, 520, and 525. Connector 515 may be accepted into a cylindrical or spherical cup or plate 545, connector 520 may be accepted into a V-shaped groove 550 (which may be orthogonal to the edge of the ring closest to connector 520), and connector 525 may be accepted into a concave tetrahedron 555. This configuration may constrain frame 510 to be reattached to mounting surface 540 in precisely the same configuration each time. Although not shown, frame 510 may have LEDs mounted around the edge, a lens in a center, one or more electrical terminals, and/or one or more magnetic connectors, which may be located on (or embedded in) frame 510, mounting surface 540, or both. Rounded connectors 515, 520, and 525 and/or concavities 545, 550, and 555 may be magnets or may be formed from a ferromagnetic material. Similarly, rounded connectors 515, 520, and/or 525 may include one or more electrical terminals.

As shown, tetrahedron 555 may provide three contact points, while V-shaped groove 550 may provide two and plate 545 may provide one for a total of six contact points. One benefit of this design may be that the center of rotation is located at the tetrahedron.

FIG. 6 depicts a similar mounting surface embodiment to the embodiment depicted in FIG. 5, but in FIG. 6 three rounded connectors 615 on frame 610 may fit into three V-shaped grooves 640 in mounting surface 620. Similar to the configuration depicted in FIG. 5, magnetic connectors may be located on (or embedded in) frame 610, mounting surface 620, or both. Furthermore, rounded connectors 615 and/or V-shaped grooves 640 may be magnets or may be formed from a ferromagnetic material. Each of the three V-shaped grooves 640 may provide two contact points for a total of six restraining surfaces. This design may benefit from symmetry and therefore easier manufacturing techniques.

FIG. 7 depicts another mounting surface embodiment, and in FIG. 7 each of three rounded connectors 725 may fit into a pair of horizontal cylinders 750 in the mounting surface. Each of the pairs of horizontal cylinders may radiate outward from a common center. Magnetic connectors may be located on (or embedded in) the frame, the mounting surface, or both. Rounded connectors 725 and/or cylinders 750 may be magnets or magnetized.

FIG. 8 depicts an embodiment having in combination several of the features described herein. A frame 810 may include magnets 820, LEDs 870, rounded connectors 850, 855, and 860, and pogo pins 840. A mounting surface 890 may include contacts 880 for the pogo pins, and receptors 882, 884, and 886 may be configured as a kinematic coupling system to hold frame 810.

FIG. 9 depicts augmented reality glasses 900 configured for use with the frames disclosed herein. A detachable frame 910 may secure lenses 940 and emitters 920 to augmented reality glasses 900, similar to the head-worn display system depicted in FIG. 3. Frame 910 may be magnetically connected to augmented reality glasses 900 via any of the embodiments described herein. In an alternate embodiment, a frame containing only the lenses 940, without any emitters 920, may be similarly attached to augmented reality glasses 900, thus enabling quick interchangeability of lenses. Conversely, a frame including only emitters 920, without lenses 940 may be attached to augmented reality glasses 900.

The devices and systems disclosed herein may enable a user may attach a magnetically attachable frame to a head-worn display system to provide eye tracking, optical correction, and/or to provide any other suitable feature. As mentioned above, the user may remove the frame to change the functionality or optical power of a head-worn display system. The disclosed frames may be secured and aligned using one or more magnetic, mechanical, and electrical attachments of embodiments described herein. In some embodiments, the frame may be constrained to be realigned in the same precise position (within a configurable tolerance) as before the frame was removed.

In one or more embodiments, less positionally precise mounting may be used. For example, the surface of the frame attached to the display system and/or the surface of the display system attached to the frame may be a flat plane or otherwise comprise no precision mount component, or may contain fewer precision mount components than the embodiments depicted in FIGS. 5-8. In such embodiments one or more magnets embedded into either surface (or both surfaces) may be used to hold the frame in place.

In one or more embodiments, one or more precision mount components (e.g., spherical connectors, grooves, etc.) may be used as electrical connectors, instead of (or in addition to) pogo pins or other separate electrical connectors.

The embodiments described herein may provide mechanical and electrical connections that allow for quick release and for both quick and precise reattachment of an emitter- or lens-holding frame to a near-eye display of a head-worn display. Moreover, embodiments described herein may provide additional benefits, such as passive activation/deactivation of varifocal features, or changing varifocal mode for non-real-time position acquisition, as a function of the gain or loss of electrical connection.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    an optical component configured for use with a near-eye display of a head-worn display system, wherein:
        the optical component comprises an emitter that, when aligned with the near-eye display, emits light toward an eye of a user; and
    the head-worn display system comprises (1) a power source for the emitter and (2) an eye-tracking subsystem that has at least one sensor and is configured to track the eye of the user by detecting light from the emitter that is reflected from the eye of the user; and
    a frame that magnetically attaches to the head-worn display system, wherein:
        the frame comprises the optical component, which attaches to the frame via a kinematic mounting mechanism, and an electrical terminal;
        the kinematic mounting mechanism comprises (1) a first spherical surface in contact with a concave tetrahedron, (2) a second spherical surface in contact with a v-shaped groove, and (3) a third spherical surface in contact with a flat plate; and
        when the frame is attached to the head-worn display system, (1) the frame aligns the emitter relative to the at least one sensor and (2) the electrical terminal electrically couples the emitter to the power source.

2. The apparatus of claim 1, wherein the optical component comprises a lens configured to, when aligned for use with the near-eye display, focus light from the near-eye display on an eye of a user.

3. The apparatus of claim 2, wherein the lens is dimensioned to correct for at least a portion of a refractive error of the eye of the user.

4. The apparatus of claim 1, wherein the emitter comprises a plurality of infrared light emitters disposed around a perimeter of the frame.

5. The apparatus of claim 4, wherein the infrared light emitters are configured to, when aligned with the near-eye display, emit infrared light toward an eye of a user.

6. The apparatus of claim 1, wherein the electrical terminal comprises a spring-loaded pin.

7. The apparatus of claim 1, wherein the electrical terminal comprises a socket dimensioned to receive a spring-loaded pin.

8. The apparatus of claim 1, wherein the frame is configured to magnetically attach to the head-worn display system at an exit-pupil side of the near-eye display.

9. The apparatus of claim 1, wherein:
    the optical component comprises a right lens and a left lens;
    the frame is dimensioned to hold the right lens between a right eye of a user a the near-eye display; and
    the frame is dimensioned to hold the left lens between a left eye of the user and the near-eye display.

10. The apparatus of claim 1, wherein the near-eye display comprises:
    a projector; and
    a waveguide comprising a coupling element that receives light from the projector and a decoupling element that transmits the light from the projector toward an eye of a user.

11. The apparatus of claim 1, wherein (1) the concave tetrahedron provides three contact points for the first spherical surface, (2) the V-shaped groove provides two contact points for the second spherical surface, and (3) the flat plate provides one contact point for the third spherical surface.

12. The apparatus of claim 1, wherein the concave tetrahedron comprises a center of rotation for the kinematic mounting mechanism.

13. A head-worn display system comprising:
    a near-eye display;
    an optical component configured for use with the near-eye display, wherein the optical component comprises an emitter that, when aligned with the near-eye display, emits light toward an eye of a user;

a power source for the emitter;

an eye-tracking subsystem that has at least one sensor and is configured to track the eye of the user by detecting light from the emitter that is reflected from the eye of the user; and a frame that is magnetically detachable from the head-worn display system, wherein:

the frame comprises the optical component, which attaches to the frame via a kinematic mounting mechanism, and an electrical terminal;

the kinematic mounting mechanism comprises (1) a first spherical surface in contact with a concave tetrahedron, (2) a second spherical surface in contact with a v-shaped groove, and (3) a third spherical surface in contact with a flat plate; and when the frame is attached to the head-worn display system, (1) the frame aligns the emitter relative to the at least one sensor and (2) the electrical terminal electrically couples the emitter to the power source.

14. The head-worn display system of claim 13, further comprising a head-worn display system frame dimensioned to hold the near-eye display in front of an eye of a user.

15. The head-worn display system of claim 13, wherein the near-eye display comprises at least one virtual-reality display screen.

16. The head-worn display system of claim 13, wherein the near-eye display comprises:

a projector; and a waveguide comprising a coupling element that receives light from the projector and a decoupling element that transmits the light from the projector toward an eye of a user.

17. The head-worn display system of claim 13, wherein:

the optical component comprises a right lens and a left lens;

the frame is dimensioned to hold the right lens between a right eye of a user a the near-eye display; and the frame is dimensioned to hold the left lens between a left eye of the user and the near-eye display.

18. The head-worn display system of claim 17, wherein:

the emitter comprises:

at least one left emitter that emits light toward the left eye of the user; and at least one right emitter that emits light toward the right eye of the user; and the eye-tracking subsystem is configured to track the left and right eyes of the user by detecting light from the left and right emitters that is reflected from the left and right eyes of the user.

19. The head-worn display system of claim 17, wherein:

the left lens is dimensioned to correct for at least a portion of a refractive error of the left eye of the user; and the right lens is dimensioned to correct for at least a portion of a refractive error of the right eye of the user.

20. A device comprising:

a frame configured to releasably attach to a head-worn optical system via a kinematic mounting mechanism comprising (1) a first spherical surface in contact with a concave tetrahedron, (2) a second spherical surface in contact with a v-shaped groove, and (3) a third spherical surface in contact with a flat plate, wherein the frame comprises an emitter that, when aligned with a near-eye display, emits light toward an eye of a user, and an electrical terminal;

the head-worn optical system comprises (1) a power source for the emitter and (2) an eye-tracking subsystem that has at least one sensor and is configured to track the eye of the user by detecting light from the emitter that is reflected from the eye of the user; and at least one emitter disposed within the frame, wherein:

the frame, when attached to the head-worn optical system, positions the emitter to emit light toward the eye of the user and positions the electrical terminal to electrically couple the emitter to the power source; and the eye-tracking subsystem is configured to track the eye of the user by detecting light from the emitter that is reflected from the eye of the user.

* * * * *